(12) United States Patent
Corella

(10) Patent No.: US 7,340,600 B1
(45) Date of Patent: Mar. 4, 2008

(54) AUTHORIZATION INFRASTRUCTURE BASED ON PUBLIC KEY CRYPTOGRAPHY

(75) Inventor: Francisco Corella, Hayward, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/483,185

(22) Filed: Jan. 14, 2000

(51) Int. Cl.
  H04L 9/00 (2006.01)
  G06F 7/04 (2006.01)
  G06F 7/58 (2006.01)
  G06F 15/16 (2006.01)

(52) U.S. Cl. ............ 713/155; 713/156; 713/158; 726/5; 726/10; 726/18

(58) Field of Classification Search ............ 713/155, 713/158, 156; 726/18, 5, 10
See application file for complete search history.

(56) References Cited

U.S. PATENT DOCUMENTS

| | | | |
|---|---|---|---|
| 4,324,645 A | 4/1982 | Angevine et al. | |
| 4,881,264 A | 11/1989 | Merkle | |
| 5,210,795 A * | 5/1993 | Lipner et al. | 713/187 |
| 5,224,163 A | 6/1993 | Gasser et al. | |
| 5,276,901 A * | 1/1994 | Howell et al. | 707/9 |
| 5,475,826 A | 12/1995 | Fischer | |
| 5,793,868 A | 8/1998 | Micali | |
| 5,796,841 A | 8/1998 | Cordery et al. | |
| 5,825,880 A | 10/1998 | Sudia et al. | |
| 5,850,442 A | 12/1998 | Muftic | |
| 5,850,444 A | 12/1998 | Rune | |
| 5,903,882 A * | 5/1999 | Asay et al. | 705/44 |
| 5,982,898 A * | 11/1999 | Hsu et al. | 713/156 |
| 5,996,076 A | 11/1999 | Rowney et al. | |
| 5,999,919 A | 12/1999 | Jarecki et al. | |
| 6,009,177 A | 12/1999 | Sudia | |
| 6,023,506 A | 2/2000 | Ote et al. | |
| 6,029,150 A | 2/2000 | Kravitz | |
| 6,044,462 A | 3/2000 | Zubeldia et al. | |
| 6,058,484 A * | 5/2000 | Chapman et al. | 713/202 |

(Continued)

FOREIGN PATENT DOCUMENTS

WO    WO 99/19845    4/1999

(Continued)

OTHER PUBLICATIONS

Foster, Ian. A Security Architecture for Computational Grids. ACM. San Francisco CA, 1998.

(Continued)

*Primary Examiner*—Kambiz Zand
*Assistant Examiner*—Christopher J Brown

(57) ABSTRACT

A public key authorization infrastructure includes a client program accessible by a user and an application program. A certificate authority issues a long-term certificate that binds a public key of the user to long-term identification information related to the user. A directory stores the issued long-term certificate and short-term authorization information related to the user. A credentials server issues a short-term certificate to the client. The short-term certificate binds the public key to the long-term identification information and to the short-term authorization information. The client presents the short-term certificate to the application program for authorization and demonstrates that the user has knowledge of a private key corresponding to the public key in the short-term certificate. The short-term certificate includes an expiration date, and is not subject to revocation.

20 Claims, 8 Drawing Sheets

U.S. PATENT DOCUMENTS

| | | | |
|---|---|---|---|
| 6,092,201 | A | 7/2000 | Turnbull et al. |
| 6,202,150 | B1 | 3/2001 | Young et al. |
| 6,202,151 | B1 | 3/2001 | Musgrave et al. |
| 6,212,636 | B1 | 4/2001 | Boyle et al. |
| 6,226,743 | B1 * | 5/2001 | Naor et al. ................. 713/177 |
| 6,230,266 | B1 | 5/2001 | Perlman et al. |
| 6,233,341 | B1 * | 5/2001 | Riggins ...................... 380/277 |
| 6,233,577 | B1 | 5/2001 | Ramasubramani et al. |
| 6,253,322 | B1 | 6/2001 | Susaki et al. |
| 6,263,446 | B1 * | 7/2001 | Kausik et al. .............. 713/201 |
| 6,282,295 | B1 | 8/2001 | Young et al. |
| 6,324,645 | B1 | 11/2001 | Andrews et al. |
| 6,327,578 | B1 | 12/2001 | Linehan |
| 6,367,013 | B1 | 4/2002 | Bisbee et al. |
| 6,389,136 | B1 | 5/2002 | Young et al. |
| 6,393,563 | B1 * | 5/2002 | Maruyama et al. ......... 713/155 |
| 6,484,259 | B1 | 11/2002 | Barlow |
| 6,607,136 | B1 | 8/2003 | Atsmon et al. |
| 6,754,829 | B1 * | 6/2004 | Butt et al. ...................... 726/8 |
| 2001/0037358 | A1 | 11/2001 | Clubb et al. |
| 2002/0143710 | A1 | 10/2002 | Liu |

FOREIGN PATENT DOCUMENTS

| | | |
|---|---|---|
| WO | WO 99/35783 | 7/1999 |
| WO | WO 01/43344 | 6/2001 |

OTHER PUBLICATIONS

Wheeler, Lynn. Three Digital Signature Models . . . for x9.59. Nov. 28, 1997.
Stephen Cobb. Network World. Framingham: Jul. 7, 1997. vol. 14, Iss. 27; p. 53, 3 pgs.
Encryption Plus Folders. Encryption Plus Folders Enterprise. 2002.
Moeller, Michael. Digital IDs: offering expanded view of users: Verisign's next Digital certificates extend electronic ID's to include personal Data. PC Week. Zipp-Davis Publishing Co. Feb. 3, 1997.
Schneier, Bruce, "Applied Cryptography," Second Edition, XP-002250458, pp. 31-35, 52-54, 185-187, 574-577, 587 (1996).
Vanstone, Menezes, "Handbook of Applied Cryptography," XP-002250459, pp. 553, 576-577, 660-661 (1997). (pp. 576-577 previously cited).
Euopean Search Report for Application No. 00 12 7693 mailed on Aug. 21, 2003 (3 pages).
Adams, C. et al., "Internet X.509 Public Key Infrastructure Certificate Management Protocols," Network Working Group, Request for Comments: 2510, pp. 1-72 (1999).
Menezes, Alfred J., "Handbook of Applied Cryptography," Chapter 13, pp. 548 (1997).
Schneier, Bruce, "Applied Cryptography," pp. 185 (1996).
M. Boe et al., "TLS-Based Telnet Security," Internet Engineering Task Force, Internet Draft, pp. 1-20, (Updated Version Oct. 24, 2000, Previous Version Sep. 1998). < http://www.normos.org/ietf/draft/draft-ietf-tn3270e-telnet-tls-05.txt>.
D. Borman, "Telnet Authentication Option," Network Working Group, Request for Comments: 1416, pp. 1-7, (Feb. 1993). < http://www.csl.sony.co.jp/rfc/>.
M. Carpenter et al., "Securing FTP with TLS," Internet Engineering Task Force, Internet Draft, pp. 1-23, (Jan. 28, 1998). < http://war.jgaa.com/ftp/draft/draft-murray-auth-ftp-ssl-03.txt>.
C. Ellison et al., "SPKI Certification Theory," Network Working Group, Request for Comments: 2693, pp. 1-43, (Updated Version Sep. 1999, Previous Version Nov. 17, 1998). < http://www.csl.sony.co.jp/rfc/>.
S. Farrell, "TLS Extensions for AttributeCertificate Based Authorization," Transport Layer Security Working Group, Internet Engineering Task Force, Internet Draft, pp. 1-11, (Aug. 20, 1998). <http://www.alternic.org/draft/draft-ietf-tls-attr-cert-O1.txt>.
M. Horowitz et al., "FTP Security Extensions," Networking Working Group, Request for Comments: 2228, pp. 1-27, (Oct. 1997). < http://www.csl.sony.co.jp/rfc/>.
R. Housley et al., "FTP Authentication Using DSA," CAT Working Group, Internet Engineering Task Force, Internet Draft, pp. 1-8, (Feb. 1998). < http://www.alternic.org/draft/draft/letf-cat-ftpdsaauth-O2.txt>.
R. Housley et al., "Telnet Authentication Using DSA," Secure Telnet Working Group, Internet Engineering Task Force, Internet Draft, 7 pages, (Jul. 1998). < http://www.alternic.org/draft/draft/housley-telnet-auth-dsa-O2.txt.
J. Kohl et al., "The Kerberos Network Authentication Service (V5)," Network Working Group, Request for Comments: 1510, pp. 1-112, (Sep. 1993). < http://www.csl.sony.co.jp/rfc/>.
S. Micali, "Efficient Certificate Revocation," Massachusetts Institute of Technology, Laboratory for Computer Science, pp. 1-10 (Mar. 22, 1996).
M. Myers et al., "X.509 Internet Public Key Infrastructure Online Certificate Status Protocol-OCSP," Netw ork Working Group, Request for Comments: 2560, pp. 1-22, (Jun. 1999). < http://w w w .csl.sony.co.jp/rfc/>.
M. Naor et al., "Certificate Revocation and Certificate Update," USENIX Association, Seventh USENIX Security Symposium, pp. 217-228, (Jan. 26-29, 1998).
C. New man, "Telnet SASL Option," Netw ork Working Group, Internet Engineering Task Force, Internet Draft, 6 pages, (Nov. 1998). < http://globecom.net/ietf/draft/draft-new man-telnet-sasl-O1.html>.
E. Rescorla, "HTTP Over TLS," Internet Engineering Task Force, Internet Draft, pp. 1-6, (Sep. 1998). < http://w w w .alternic.org/draft/draft-ietf-tls-https-O2.txt>.
RSA Security Inc., "RSA Keon Advanced PKI: A Security Architecture for Enabling E-Business," Solution White Paper, pp. 1-14, (1999). < http://w w w .rsasecurity.com/products/keon/whitepapers/advpkiw p/rsa_keon_advanced_pki_w p.pdf>.
RSA Security Inc., "Security Services Provided by the RSA Keon Desktop v5.1," White Paper, pp. 1.8, (1999). < http://w w w .rsasecurity.com/products/keon/w hitepapers/desktop/keon_desktop_w p.pdf>.
B. Tung et al., "Public Key Cryptography for Initial Authentication in Kerberos," Internet Engineering Task Force, Internet Draft, 21 pages (Expires May 15, 1999) < http://w w w .alternic.org/draft/draft-ietf-cat-kerberos-pk-init-O7.txt>.
Web Page of the "Simple Public Key Infrastructure (spki)," Working Group, 2 pages, (Last Modified Jan. 16, 2001), < http://w w w .ietf.org/html.charters/spki-charter.html>.
Web Page of the "Transport Layer Seucrity (tls)," Working Group, 2 pages, (Last Modified Mar. 30, 2001), < http://w w w .ietf.org/html.charters/tfs-charters.html>.
International Telecommunication Union (ITU-T) Recommendation X.509, "Information Technology Open Systems Interconnection, The Directory: Authentication Framework," pp. i-81 (Jun. 1997).
R. Rivest, "Can We Eliminate Certificate Revocation Lists?," MIT Laboratory for Computer Science, pp. 178-183, (Feb. 1998). < http://theory.lcs.mit.edu/rivest>.
Menezes, "Handbook of Applied Cryptography," pp. 33, 37-39, 321-322, 559-560, 576-577, (1997).
PCT International Search Report for International Application No. PCT/US01/01520 mailed on Aug. 10, 2001 (8 pages).
Press, Jim, "Secure Transfer of Identity and Privilege Attributes in an Open Systems Environment," Computers & Security, vol. 10, No. 2., pp. 117-127, (Apr. 1991).
"SET Secure Electronic Transaction Specification," Book 1: Business Description, Version 1.0, XP-002203148, pp. i-72, (May 31, 1997).
European Search Report for Application No. EP 00 31 0771 mailed on Jul. 12, 2002 (4 pages).

* cited by examiner

AUTHORIZATION INFRASTRUCTURE BASED ON PUBLIC KEY CRYPTOGRAPHY

CROSS REFERENCE TO RELATED APPLICATIONS

This patent application is related to the following Non-Provisional U.S. patent applications: Ser. No. 09/483,189, entitled "METHOD AND APPARATUS FOR PROVIDING FIELD CONFIDENTIALITY IN DIGITAL CERTIFICATES,"; Ser. No. 09/483,356, entitled "LIGHTWEIGHT PUBLIC KEY INFRASTRUCTURE EMPLOYING DISPOSABLE CERTIFICATES,"; and Ser. No. 09/483,186, entitled "LIGHTWEIGHT PUBLIC KEY INFRASTRUCTURE EMPLOYING UNSIGNED CERTIFICATES,", and the following Provisional U.S. Patent Application Ser. No. 60/176,157, entitled "PUBLIC KEY VALIDATION SERVICE,", which are all filed on even date herewith, are all assigned to the same assignee as the present application, and are all herein incorporated by reference.

THE FIELD OF THE INVENTION

The present invention relates to public key cryptosystems, and more particularly, to an authorization infrastructure based on public key cryptography that provides centralized authorization in a distributed system, such as an enterprise network.

BACKGROUND OF THE INVENTION

Public key cryptosystems are globally deployed on the World Wide Web, as well as on a growing number of enterprise networks, for establishment of secure communication channels. Every user in a public key cryptosystem has a pair of keys including a public key and a private key. The public key is disclosed to other users while the private key is kept secret. A public key cryptosystem typically has a primary designed use, such as for encryption, digital signature, or key agreement. Public key cryptosystems are also used for user authentication. For example, a user can authenticate itself to other users by demonstrating knowledge of its private key, which other users can verify using the corresponding public key.

In an application of a public key cryptosystem for authenticating a user, the public key must be securely associated with the identity of the user that owns the public key by authenticating the public key itself. Public key certificates are typically employed to authenticate the public key. A public key certificate is a digital document, signed by a certificate authority, that binds a public key with one or more attributes that uniquely identify the owner of the public key. The public key certificate can be verified using the certificate authority's public key, which is assumed to be well known or is recursively certified by a higher authority. For example, in a corporation, a public key certificate can bind a public key to an employee number.

A public key infrastructure (PKI) refers to the collection of entities, data structures, and procedures used to authenticate public keys. A traditional PKI comprises a certificate authority, public key certificates, and procedures for managing and using the public key certificates.

One type of a user of a PKI owns the public key contained in a public key certificate and uses the certificate to demonstrate the users identity. This type of user is referred to as the subject of the certificate or more generally as the subject. Another type of user relies on a public key certificate presented by another user to verify that the other user is the subject of the certificate and that the attributes contained in the certificate apply to the other user. This type of user that relies on the certificate is referred to as a verifier or relying party.

The association between a public key and an identity can become invalid because the attributes that define the identity no longer apply to the owner of the public key, or because the private key that corresponds to the public key has been compromised. A PKI typically employs two complementary techniques for dissociating a public key from an identity. In the first technique, each public key certificate has a validity period defined by an expiration date, which is a substantial period from the issue date, such as one year from the issue date. In the second technique, the certificate authority revokes a public key certificate if the public key certificate's binding becomes invalid before the expiration date. One way of revoking a public key certificate is by including a serial number of the public key certificate in a certificate revocation list (CRL), which is signed and issued by the certificate authority at known periodic intervals, such as every few hours or once a day. An entity that relies on a certificate is responsible for obtaining the latest version of the CRL and verifying that the serial number of the public key certificate is not on the list.

CRLs typically become quite long very quickly. When the CRLs become long, performance is severely impacted. First, CRL retrieval consumes large amounts of network bandwidth. Second, each application has to retrieve the CRL periodically, parse the CRL, and allocate storage for the CRL. Then, the application needs to carry out a linear search of the CRL for the public key certificate serial number when the application verifies each public key certificate.

An on-line certificate status protocol (OCSP) operates by permitting the verifier of the public key certificate to ask the certificate authority if the certificate is currently valid. The certificate authority responds with a signed statement. The OCSP allows CRLs to be avoided, but requires the verifier to query the certificate authority as part of the transaction that employs the public key certificates. The verifier querying the certificate authority increases the time it takes to perform the transaction. The OCSP scheme is highly vulnerable to a denial-of-service attack, where the attacker floods the certificate authority with queries. Responding to each query is computationally expensive, because each response requires a digital signature.

Even though public key cryptography is used for authentication in distributed system security, public key cryptography has yet to be efficiently implemented into an authorization infrastructure for distributed systems. However, substantial efforts have been made to extend public key cryptography to the area of authorization. For example, the Simple Public Key Infrastructure (SPKI) working group of the Internet Society and the Internet Engineering Task Force has proposed authorization certificates that bind a public key to authorization information. See C. M. Ellison, B. Frantz, B. Lampson, R. Rivest, B. M. Thomas and T. Ylonen, *SPKI Certificate Theory*, Request for Comments 2560 of the Internet Engineering Task Force, September 1999. However, the SPKI working group is concerned only with the format of authorization certificates rather than the use of authorization certificates.

The Transport Layer Security (TLS) working group of the Internet Society and the Internet Engineering Task Force proposes using attribute certificates. See S. Farrell, *TLS Extensions for Attribute Certificate-Based Authorization*, Internet Draft, Aug. 20, 1998; and Web Page of the TLS Working Group, http://www.ietf.org/html.charters/tls-charter.html. An attribute certificate binds a name to authorization information and does not contain a public key. A TLS client would be allowed to present an attribute certificate in addition to an ordinary public key certificate during the initial hand-shake. However, the TLS proposal only applies to the TLS protocol and does not explain how attribute certificates are issued. Thus far, the efforts of the Internet Society and the Internet Engineering Task Force have not yet provided a concrete blue print for solving the authorization problem using public key cryptography.

The security architecture of Microsoft's Windows 2000® operating system addresses authentication and authorization at the scale of an enterprise network. However, the Windows 2000® operating system security architecture is based on the symmetric-key Kerberos protocol, with public-key enhancements that accommodate smart card authentication. Consequently, the Windows 2000® operating system security architecture is inherently harder to manage, less scalable, and more vulnerable to attack than could be possible if the security architecture was entirely based on public-key cryptography. Moreover, the Windows 2000® operating system security architecture's inter-operability with other Kerberos implementations is limited.

The Kerberos authorization infrastructure is based on symmetric key cryptography not public key cryptography. In Kerberos, symmetric keys must be shared between a Kerberos Key Distribution Center, the clients, and the applications. The shared symmetric keys must be set up by hand at great administrative expense, or the shared symmetric keys must be set up using secured channels that are not part of the Kerberos infrastructure, which increases system complexity and vulnerability. Thus, in the Kerberos infrastructure, the key set up process provides an opportunity for attack.

The security architecture of Microsoft Windows 2000® operating system is based on an extension of Kerberos called Public Key Cryptography for Initial Authentication in Kerberos (PKINIT). PKINIF allows public key cryptography to be used for user authentication. PKINIT makes it possible to use smart cards for authentication. Nevertheless, the Windows® operating system Domain Controller, which serves the role of the Kerberos Key Distribution Center in the Windows 2000® operating system security architecture, must still share symmetric keys with other computers on the network. When these computers are Windows® operating system based machines, the shared symmetric keys are distributed automatically. As in the case of the Kerberos infrastructure itself, this adds complexity and vulnerability to the protocol. When these computers are non-Windows® operating system based machines, the shared symmetric keys have to be installed by hand by the user administrator, which is quite costly and limits scalability.

The Windows 2000® operating system security architecture does not scale well beyond a single domain. Access to machines in other domains relies on trust relationships along a hierarchy or a web of domain controllers, which is difficult to administer and introduces delays.

Kerberos tickets used in the Windows 2000® operating system security architecture carry proprietary security identifiers (SIDs), which are used to obtain access to objects or properties of objects. Since, non-Windows® operating system based machines and applications do not understand SIDs, inter-operability in a heterogeneous environment is limited.

For reasons stated above and for other reasons presented in greater detail in the Description of the Preferred Embodiment section of the present specification, there is a need for an efficient authorization infrastructure based on public key cryptography which can provide centralized authorization in a distributed system, such as an enterprise network.

SUMMARY OF THE INVENTION

The present invention provides a public key authorization infrastructure including a client program accessible by a user and an application program. A certificate authority of the public key authorization infrastructure issues a long-term public key identity certificate (long-term certificate). The long-term certificate binds a public key of the user to long-term identification information related to the user. A directory in the public key authorization infrastructure stores the issued long-term certificate. A credentials server of the public key authorization infrastructure issues a short-term public key credential certificate (short-term certificate) to the client. The short-term certificate binds the public key of the user to the long-term identification information related to the user from the long term certificate and to the short-term authorization information related to the user from the directory. The client presents the short-term certificate to the application program for authorization and demonstrates that the user has knowledge of a private key corresponding to the public key in the short-term certificate.

In one embodiment, the short-term certificate includes an expiration date/time, and is not subject to revocation. A validity period from when the credentials server issues the short-term certificate to the expiration date/time is sufficiently short such that the short-term certificate does not need to be subject to revocation. In one embodiment, the public key authorization infrastructure includes a revocation mechanism, such as a certificate revocation list (CRL) or an on-line certificate status protocol (OCSP), for revoking the issued long-term certificate. If a CRL is employed, the expiration date/time is before a date/time at which the next new CRL is due.

In one embodiment of the public key authorization infrastructure according to the present invention, the directory also stores the issued long-term certificate. In one embodiment, the certificate authority gives the issued long-term certificate directly to the client program.

In one embodiment, the short-term certificate is a non-structured short-term certificate. In another embodiment, the public key authorization infrastructure includes a second application program and the short-term certificate is a structured short-term certificate having a first folder and a second folder. The first folder corresponds to the first application program and contains long-term information and short-term information as required by the first application program. The second folder corresponds to the second application program and contains long-term information and short-term information as required by the second application. The first folder is open and the second folder is closed when the client presents the short-term certificate to the first application program for authorization. The first folder is closed and the second folder is open when the client presents the short-term certificate to the second application program for authorization. When a folder is closed its contents are not readable by the requested application program In one embodiment, the private key is stored in a secure storage medium, such as a smartcard or secure software wallet, which is accessible by the client program.

The public key authorization infrastructure according to the present invention provides an efficient authorization infrastructure based on public key cryptography which can provide centralized authorization in a distributed system, such as an enterprise network. The public key authorization infrastructure according to the present invention utilizes short-term certificates, where all necessary authorization information is contained in the short-term certificate. Thus, the application does not need to access the directory storing the issued long-term certificate and the short-term authorization information related to the user. The short-term certificates each have an expiration date and are not subject to revocation. Thus, the requested application does not need to use CRLs or other revocation mechanisms, such as OCSP. Furthermore, structured short-term certificates can be used to allow one short-term certificate to be used for more than one application.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
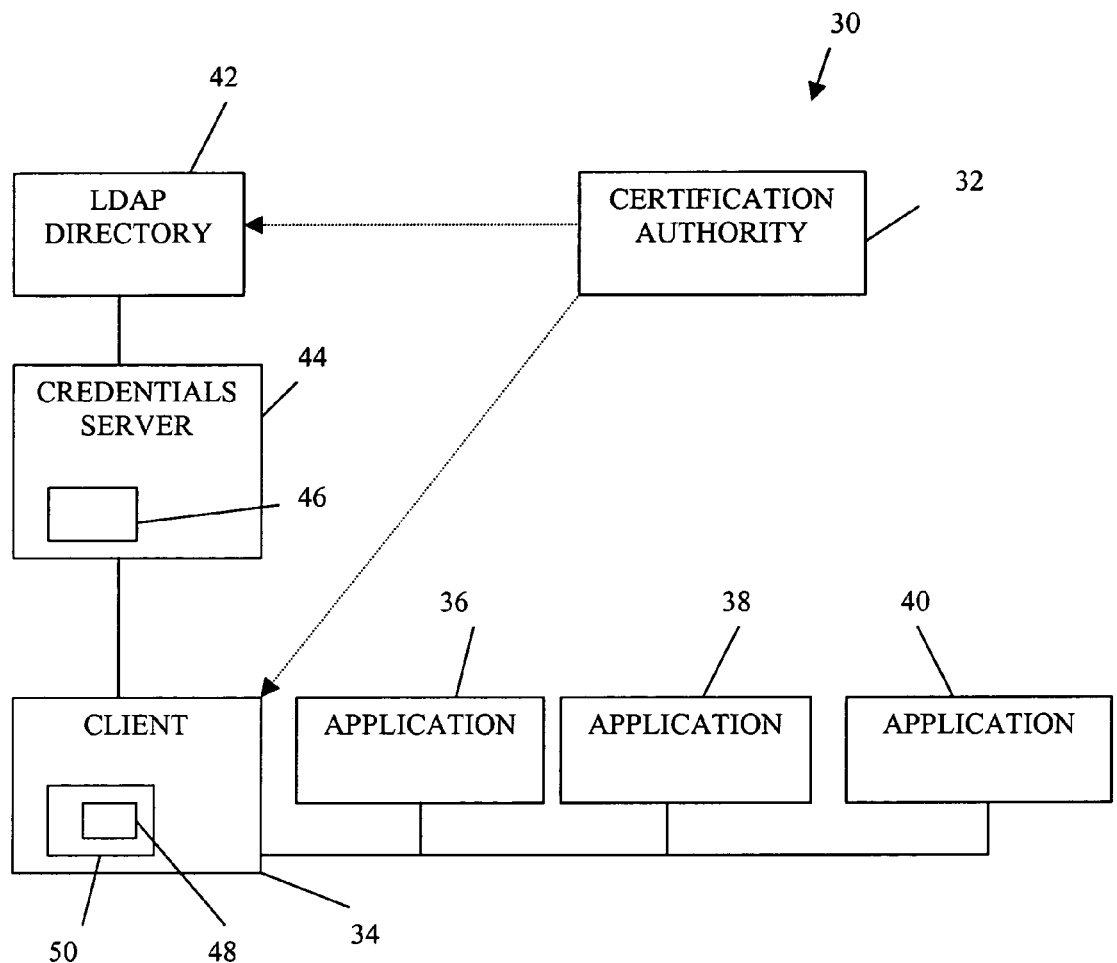
FIG. 1 is a block diagram of a public key authorization infrastructure having a credentials server according to the present invention.

A public key authorization infrastructure according to the present invention is illustrated generally at 30 in FIG. 1. Public key authorization infrastructure 30 includes several main components which are each a software program. The main software program components of public key authorization infrastructure 30 run on one or more computer systems. In one embodiment, each of the main software program components runs on its own computer system.

A certificate authority 32 issues long-term public key identity certificates (long-term certificates) to users via the user's client program, such as client 34. A long-term certificate is herein defined as a public key certificate that binds a public key to one or more names or identifiers (i.e., long-term identification information). Examples of long-term identification information include name, social-security number, and employee number. The user receiving the long-term certificate is referred to as the subject of the certificate. Certificate authority 32 optionally issues long-term certificates to application programs, such as application 36, application 38, and application 40.

For clarity, only a single certificate authority 32 is illustrated in FIG. 1. However, a typical public key authorization infrastructure according to the present invention includes a hierarchy or web of certificate authorities. In addition, only one client 34 is illustrated in FIG. 1, but each certificate authority in the public key authorization infrastructure 30 according to the present invention typically issues long-term certificates to numerous client programs.

Certificate authority 32 distributes issued long-term certificates to client 34 and/or to a lightweight directory access protocol (LDAP) directory 42 for storage. Long-term certificates typically have a validity period defined by an expiration date, which is a substantial period from the issue date, such as one year from the issue date. In addition, certificate authority 32 revokes a long-term certificate if the public key certificate binding becomes invalid before the expiration date. One way of revoking a public key certificate is by including a serial number of the long-term certificate in a certificate revocation list (CRL), which is signed and issued by certificate authority 32 at known periodic intervals, such as every few hours or once a day. Certificate authority 32 can provide the CRLs to LDAP directory 42 for publication in LDAP directory 42.

Alternatively, the validity of a long-term certificate is verified on-line by sending a certificate status inquiry to certificate authority 32 using an on-line certificate status protocol (OCSP). In the OCSP, the verifier of the long-term certificate sends the certificate status inquiry to certificate authority 32 and certificate authority 32 responds thereto with a signed statement.

A credential server 44 according to the present invention issues short-term public key credential certificates (short-term certificates) to users via the user's client program, such as client 34. Credential server 44 optionally issues short-term certificates to applications, such as applications 36, 38, and 40. Client 34 presents the short-term certificates to applications for authorization. Applications 36, 38, and 40 use trusted information about users which are contained in the short-term certificates to make authorization decisions about the users.

Credentials server 44 automatically issues short-term certificates for submittal to applications 36, 38, and 40 by client 34. Credentials server 44 automatically issues the short-term certificates based on long-term identification information contained in the long-term certificate and short-term information.

In one embodiment, credentials server 44 obtains the short-term information data needed to issue the short-term certificates from LDAP directory 42. In this embodiment, since credentials server 44 does not contain this short-term information data, credentials server 44 is easily replicated within public key authorization infrastructure 30 for increased performance.

The short-term information data contained in LDAP directory 42 relates to attribute or authorization information about the user (i.e., subject). Example short-term authorization information includes expense authorization limit for an enterprise application, co-payment amount for an insurance application, disk storage quota for an Information Technology (IT) application, and user ID plus group ID for Unix access application.

Credentials server 44 includes a private key indicated at 46, which the credential server uses to sign short-term certificates. In a small to medium distributed system, the public key corresponding to private key 46 is typically well-known. In one example embodiment of a small to medium distributed system, the public key is configured into the entities that accept short-term certificates. In a large distributed system using public key authorization infrastructure 30, public key authorization infrastructure 30 typically contains numerous credentials servers 44 having multiple private keys 46. In one embodiment of such a large distributed system, certificate authority 32 issues separate certificates to authenticate the corresponding public keys. For clarity, the following discussion assumes that the public key of credentials server 44 corresponding to private key 46 is well-known.

Client 34 has a private key 48 stored in a secure storage medium 50, such as a smartcard or secure software wallet. Client 34 also has a public key mathematically associated with private key 48.

Figure 2:
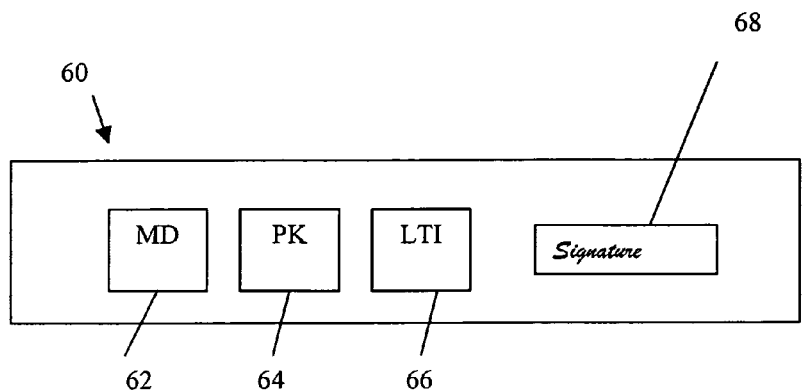
FIG. 2 is a diagram of a long-term certificate as issued from a certificate authority.

One embodiment of a long-term certificate is illustrated generally at 60 in FIG. 2. Long-term certificate 60 includes a meta-data (MD) field 62 containing data about long-term certificate 60 itself rather than data related to the user. Long-term certificate 60 includes a user's public key (PK) 64. Long-term certificate 60 includes long-term information (LTI) 66 containing long-term information related to the user, such as the user's name, the user's social security number, or the user's employee number. After being issued from certificate authority 32, long-term certificate 60 includes a certificate authority's signature 68.

Figure 3:
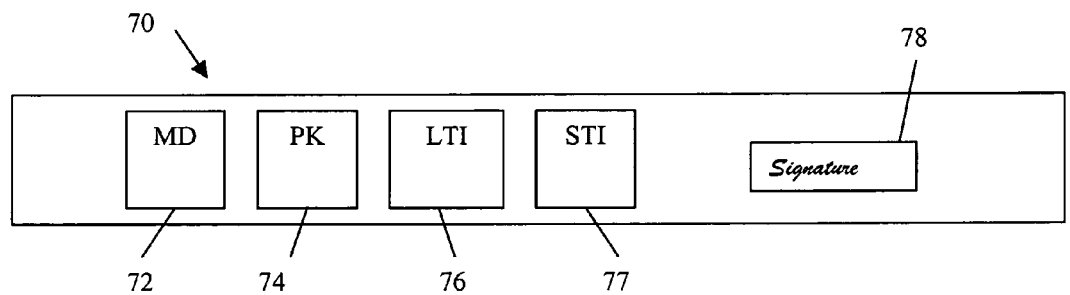
FIG. 3 is a diagram of a non-structured short-term certificate as issued by a credentials server according to the present invention.

One embodiment of a short-term certificate issued by credential server 44 is illustrated generally at 70 in FIG. 3. Short-term certificate 70 is a non-structured certificate associated with one of applications 36, 38, or 40. Short-term certificate 70 includes a meta-data (MD) field 72 containing data about short-term certificate 70 rather than the user of short-term certificate 70. Short-term certificate 70 includes a public key (PK) 74 which is the same public key as public key 64 of long-term certificate 60. The user of long-term certificate 60 and short-term certificate 70 has only one private-public key pair associated with private key 48 of smartcard or secure software wallet 50. Short-term certificate 70 includes long-term information 76 which is identical to long-term information 66 of long-term certificate 60. Short-term certificate 70 also includes short-term information 77, which contains attribute or authorization information, such as expense authorization limit for an enterprise application, co-payment amount for an insurance application, disk storage quota for an IT application, or user ID plus group ID for Unix access application. Short-term certificate 70 as issued from credential server 44 contains a credentials server's 44 signature 78. In one embodiment, non-structured short-term certificate 70 is implemented with a X.509v3 certificate.

Figure 4:
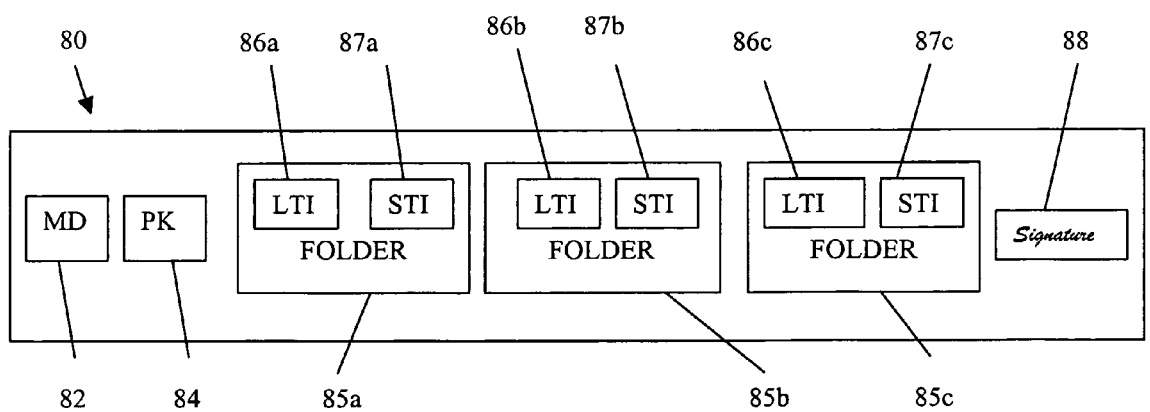
FIG. 4 is a diagram of a structured short-term certificate as issued from a credentials server according to the present invention.

An alternative embodiment of a short-term certificate issued by credentials server 44 is illustrated generally at 80 in FIG. 4. Short-term certificate 80 is a structured certificate, such as the structured certificates defined and described in co-pending application entitled "METHOD AND APPARATUS FOR PROVIDING FIELD CONFIDENTIALITY IN DIGITAL CERTIFICATES," which is incorporated by reference above. Structured short-term certificate 80 includes a meta-data field (MD) field 82, a users public key (PK) 84, and a credentials server's signature 88, which are substantially similar to meta-data field 72, public key 74, and signature 78 of non-structured short-term certificate 70 of FIG. 3. Structured short-term certificate 80, however, includes folders 85a, 85b, and 85c, which respectively correspond to application 36, application 38, and application 40. Folder 85a contains long-term information 86a and short-term information 87a as required by application 36 to make authorization decisions about the user of client 34. Similarly, folder 85b includes long-term information 86b and short-term information 87b as required by application 38 to make authorization decisions about the user of client 34. Similarly, folder 85c includes long-term information 86c and short-term information 87c as required by application 40 to make authorization decisions about the user of client 34. In one embodiment, structured short-term certificate 80 is implemented by adding a folder extension to a X.509v3 certificate.

In one embodiment, the validity period of non-structured short-term certificate 70 or structured short-term certificate 80 is indicated by an expiration date/time sub-field in meta-data field 72/82. In one embodiment, credentials server 44 itself determines the duration of the validity period of short-term certificate 70/80 for setting the expiration date/time sub-field. In an alternative embodiment, credentials server 44 obtains the duration of the validity period of short-term certificate 70/80 from meta-data field 62 in long-term certificate 60 for setting the expiration date/time sub-field.

The validity period of short-term certificate 70/80 is substantially equivalent, from the point of view of security, to the update period of the CRL stored in LDAP directory 42. However, the validity period of short-term certificate 70/80 in some embodiments of the invention is much shorter than the update period of the CRL. For example, the validity period of short-term certificate 70/80 can be a few hours or even as short as a few minutes.

Client 34 of public key authorization infrastructure 30 of FIG. 1 is a program or process running on behalf of the user of the public key. Example client 34 programs include an operating system of a single-user personal computer and a login shell of a Unix workstation. Client 34 has access to the user's private key 48 stored in smartcard or secure software wallet 50.

LDAP directory 42 is suitably a standard LDAP directory. For each application (e.g., application 36, application 38, and application 40) requiring authorization, a primary directory entry in LDAP directory 42 specifies a set of attributes of a user entry in the LDAP directory that are relevant to authorization decisions made by the corresponding application. In one embodiment, authorization information attributes are a set of relevant attributes provided as the set of values of a multi-valued attribute in the application entry in LDAP directory 42. In one embodiment employing structured short-term certificates, the primary directory entry in LDAP directory 42 specifies which attributes in a user entry in the LDAP directory must be included in the folder for the application.

For each user, LDAP directory 42 contains an entry having attributes assigning roles and other authorization-related parameters to the user. These authorization-related parameters typically are application-independent rather than application-specific. Examples of application-independent parameters are "management scope=64" and "employer=XYZ" in an example application for XYZ Partner Company having employees assigned restrictive access to the XYZ corporate network. Dependent application entries in LDAP directory 42 reside below a user entry and refer to entries for applications that are accessible by the user. The entry in LDAP directory 42 for each application contains attributes that assign application-specific parameters to the user represented by the parent entry. Examples of application-specific parameters are "user ID=23" and "group ID=4" in the application of a login shell of a Unix work station.

When client 34 requests credentials server 44 to issue a structured short-term certificate, such as structured short-term certificate 80 of FIG. 4, client 34 can specify the list of applications for which folders are to be created. In one embodiment, a user profile is employed to generate the list of applications for which folders are to be created. If at some point an additional folder is required for a structured short-term certificate, the additional folder is added by issuing a new structured short-term certificate.

Figure 5:
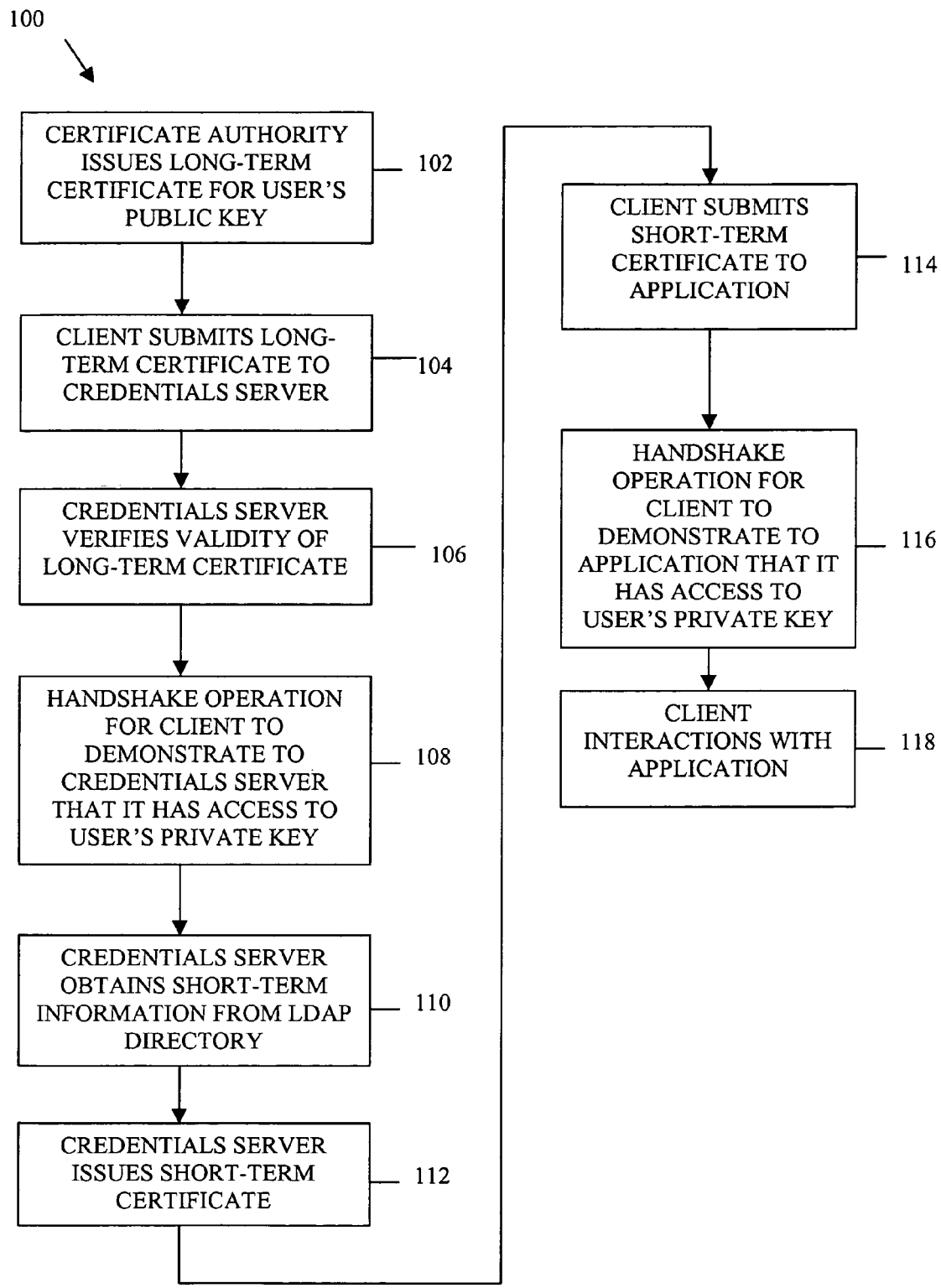
FIG. 5 is a flow diagram illustrating a generalized authorization protocol for the public key authorization infrastructure of FIG. 1.

A generalized authorization protocol for public key authorization infrastructure 30 is illustrated generally at 100 in FIG. 5. At step 102, certificate authority 32 issues a long-term certificate to client 34 for the user's public key. Step 102 for issuing the long-term certificate is performed only once.

At step 104, client 34 submits the issued long-term certificate to credentials server 44. At step 106, credentials server 44 verifies the validity of the long-term certificate. In an enterprise environment, steps 104 and 106 are performed when the user logs into the network.

An optional step 108 is required only if the short-term certificate contains confidential information. In step 108, client 34 demonstrates to credentials server 44 that client 34 has access to the user's private key 48. In one embodiment, step 108 is performed as part of a Secure Sockets Layer (SSL) handshake by using client 34's certificate option. In an enterprise environment, step 108 is performed when the user logs into the network.

At step 110, credentials server 44 obtains short-term information from LDAP directory 42. If credentials server 44 and LDAP directory 42 are on different computer systems, a communication channel between the computer systems is preferably protected, such as by SSL or host-to-host Internet Protocol Security (IPSEC). In an enterprise environment, step 110 is performed when the user logs into the network.

At step 112, credentials server 44 issues a short-term certificate to client 34. In one embodiment, the short-term certificate is a structured short-term certificate, such as structured short-term certificate 80 illustrated in FIG. 4, having one folder (e.g., 85a, 85b, and 85c) for each application (e.g., 36, 38, and 40). At step 112, all folders 85 are open. Thus, if any of folders 85 contain confidential information and a communication channel between credentials server 44 and client 34 is not deemed secure, transmission between credentials server 44 and client 34 must be encrypted, such as by SSL or host-to-host IPSEC. In an enterprise environment, step 112 is performed when the user logs into the network.

At step 114, client 34 submits the short-term certificate to an application, such as application 38. In an example step 114 where application 38 receives the short-term certificate from client 34, folders 85a and 85c are closed and a hash of the contents of folders 85a and 85c replace the contents of folders 85a and 85c. In this example step 114, folder 85b corresponding to application 38 remains open. Thus, if folder 85b contains confidential information and a communication channel between client 34 and application 38 is not deemed secure, transmission between client 34 and application 38 must be encrypted, such as by SSL or host-to-host IPSEC.

At step 116, client 34 demonstrates to application 38 that client 34 has =access to the user's private key 48. In one embodiment, step 116 is performed as part of a SSL handshake using the client 34's certificate option.

At step 118, client 34 interacts with the selected application, such as application 38. In step 118, data integrity protection must be provided to prevent connection hi-jacking or other man-in-the-middle attacks. Suitable data integrity protection is accomplished with SSL or host-to-host IPSEC.

Figure 6:
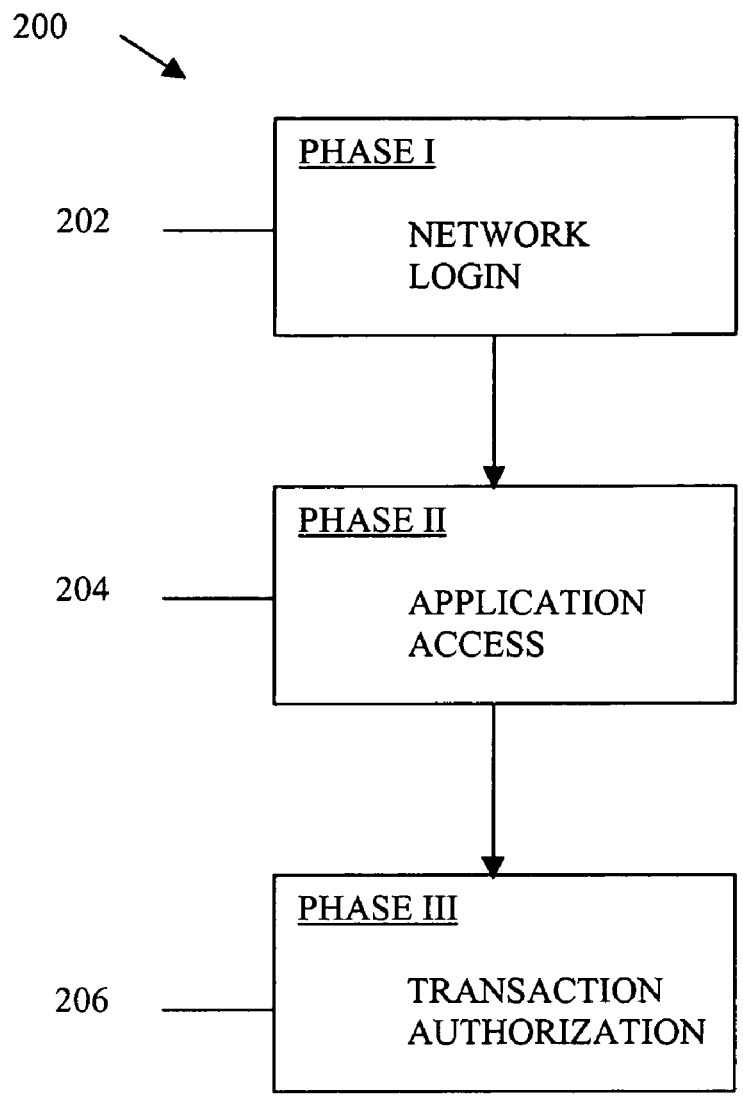
FIG. 6 is a flow diagram illustrating a more detailed authorization protocol for the public key authorization infrastructure of FIG. 1.

A more detailed authorization protocol for public key authorization infrastructure 30 is illustrated generally at 200 in FIG. 6. Authorization protocol 200 includes three phases. As indicated at 202, a phase I occurs when a user logs into the network via client 34. As indicated at 204, phase II occurs when the user of client 34 attempts to access an application, such as application 36, 38, or 40. As indicated at 206, phase III occurs when the user, while using an application, issues a transaction that requires specific authorization.

Some embodiments of public key authorization infrastructure 30 only implement phase I of authorization protocol 200. More typically, however, embodiments of public key authorization infrastructure 30 implement phase I and phase II of authorization protocol 200. Some embodiments of public key authorization infrastructure 30 implement all three phases of authorization protocol 200. Currently, few authorization infrastructures implement authorization on a per-transaction basis. The Praesidium line of authorization products, however, performs authorization on a per-transaction basis.

Figure 7:
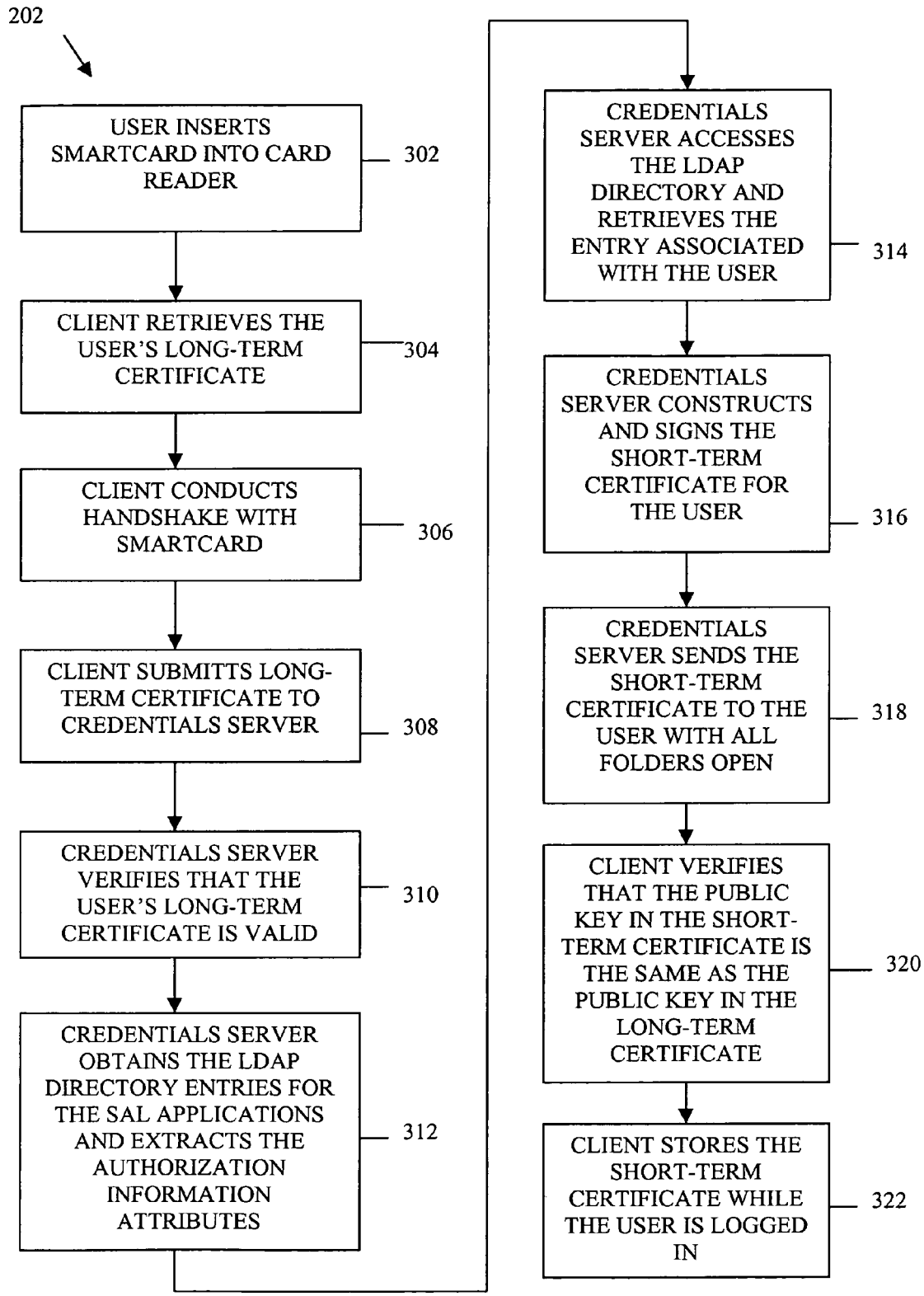
FIG. 7 is a flow diagram illustrating a network login phase of the authorization protocol of FIG. 6.

The network login phase I of authorization protocol 200 is generally illustrated at 202 in FIG. 7. The network login phase I occurs when the user logs into client 34 with an intention of accessing the network. The user may be able to locally login to client 34 as a stand-alone resource, but such a local login is not addressed herein.

At step 302, the user inserts smartcard 50 in a card reader of client 34. Smartcard 50 contains the user's name and private key 48. In one embodiment, two-factor authentication is employed, and the user also enters a PIN number on the card reader or a password at the terminal of client 34.

At step 304, client 34 retrieves the user's long-term certificate, such as long-term certificate 60. The long-term certificate binds the user's name to the user's public key and has a relatively long validity period, such as one year. In one embodiment, the long-term certificate is stored in LDAP directory 42 but is cached in client 34, so that client 34 typically retrieves the long-term certificate from its cache rather than having to access the LDAP directory. Client 34 does not verify the validity of the long-term certificate after the long-term certificate is issued by certificate authority 32. Instead, credentials server 44 verifies the validity of the long-term certificate as described below with reference to step 310.

At step 306, client 34 conducts a hand-shake with smartcard 50 to verify that private key 48 corresponds to the public key contained in the long-term certificate. In one embodiment, step 306 is performed by client 34 issuing a random challenge to smartcard 50. Smartcard 50 combines the challenge with a fresh random value, signs the result, and returns the signature together with the random value. Client 34 then verifies the signature using the public key contained in the long-term certificate.

At step 308, client 34 submits the long-term certificate to credentials server 44 as follows. First, client 34 contacts credentials server 44 and sends the user's long-term certificate and a list of frequently used secure applications. Secure applications are herein defined as applications requiring authorization. The list of frequently used secure applications is herein referred to as the secure applications list (SAL). The SAL is obtained from a user's profile. In one embodiment, the user's profile is stored in client 34. In an alternative embodiment, the user profile is stored in LDAP directory 42. If client 34 has a graphical user interface (GUI), the user can designate the SAL applications, for example, by grouping the applications in a special desktop folder. Each application is specified by name in the SAL. In one embodiment, the specified application name is the LDAP distinguished name of its primary directory entry. In one embodiment, the specified application name is a Uniform Resource Locator (URL).

As step 310, credentials server 44 verifies that the user's long-term certificate is valid. Step 310 includes the step of verifying certificate authority 32's signature on the long-term certificate and checking that the long-term certificate has not expired. In addition, credentials server 44 is required to check that the long-term certificate has not been revoked. In the embodiment where certificate authority 32 employs CRLs for revocation, credentials server 44 checks whether the credentials server has the CRL currently in force. If credentials server 44 does not have the current CRL, the credentials server retrieves the current CRL from LDAP directory 42. Credentials server 44 then verifies that the long-term certificate's serial number is not on the current CRL.

At step 312, credentials server 44 obtains the directory entries of LDAP directory 42 for the SAL applications. Credentials server 44 further extracts the authorization information attributes from these entries. Credentials server 44 typically caches application entries, so that no actual LDAP directory access is required to carry out step 312.

At step 314, credentials server 44 accesses LDAP directory 42 and retrieves the entry associated with the user. Credentials server 44 also retrieves any dependent application entries below the user entry of LDAP directory 42.

At step 316, credentials server 44 constructs and signs the short-term certificate for the user. In one embodiment, this is a structured short-term certificate, such as structured short-term certificate 80 illustrated in FIG. 4. The short-term certificate has a short validity period, such as a few hours, and is not subject to revocation. The short-term certificate binds the following information together. First, the user's public key, which is a field copied from the long-term certificate. Second, one or more fields copied from the long-term certificate and containing the user's name or other identifiers. Third, for each SAL application, a folder containing: the name of the application; the (attribute, set-of-values) pairs contained in the user entry for attributes specified by the authorization information attribute of the primary directory entry for the application; and if there is a dependent entry for the application below the user entry, the (attribute, set-of-values) pairs in that entry. If the application has no primary entry, or the primary entry has no authorization information attribute, and the application has no dependent entry below the user entry, then the folder is omitted.

At step 318, credentials server 44 sends the short-term certificate to the user, with all folders open. Since all folders are open, protection from potential eavesdropping is possibly required. If such protection is required, credentials server 44 authenticates the user and encrypts the transmission. In one embodiment, user authentication is performed by a challenge-response handshake between credentials server 44 and smartcard 50, substantially similar to the handshake performed in step 306 between client 34 and smartcard 50.

At step 320, if usage of client 34 itself requires authorization, client 34 verifies that the public key in the short-term certificate is the same as the public key in the long-term certificate that was used in step 306 to authenticate smartcard 50. Client 34 then uses the short-term certificate to decide whether the user is allowed to login the network.

At step 322, client 34 stores the short-term certificate while the user is logged in the network. Client 34 schedules a short-term certificate renewal operation, which is scheduled for a time before the short-term certificate expires. A short-term certificate renewal operation includes repeating steps 308 through 320 of phase I of authorization protocol 200.

In one embodiment, a security policy requires that steps 302 through 306 of Phase I of authorization protocol 200 be repeated after a defined period of inactivity, or at regular intervals, to verify that it is actually the user who is interacting with client 34.

Figure 8:
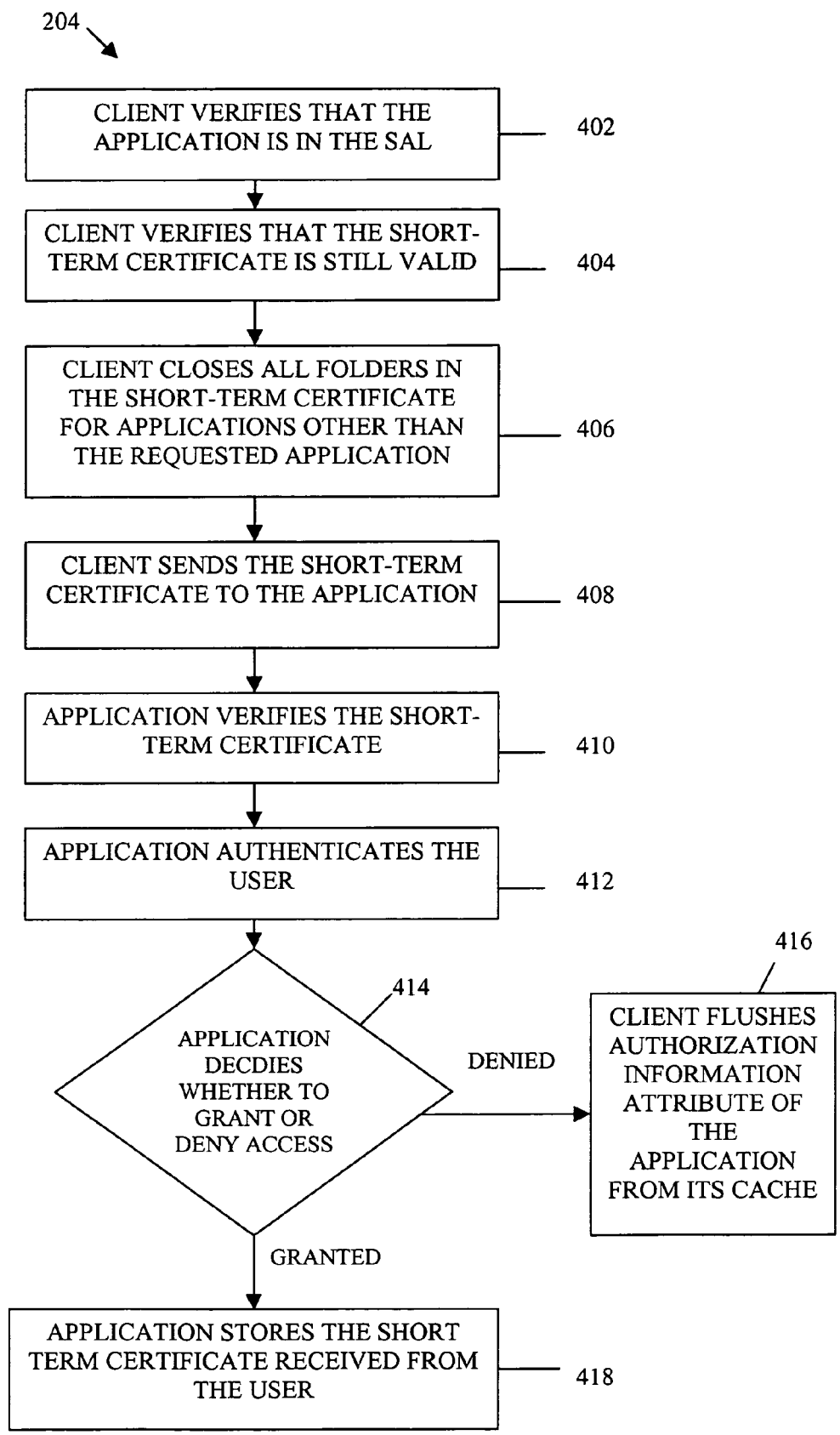
FIG. 8 is a flow diagram illustrating an application access phase of the authorization protocol of FIG. 6.

The application access Phase II of authorization protocol 200 of public key authorization infrastructure 30 is illustrated generally at 204 in FIG. 8. The application access phase II occurs when the user attempts to access a secure application.

At step 402, client 34 verifies that the application (e.g., application 36, 38, or 40) is in the SAL. If the application is not in the SAL, client 34 adds the application to the SAL, and the application remains in the SAL for the remaining time of the current login session. In step 402, if the application is added to the SAL, a certificate renewal operation is executed using the new SAL by implementing phase I network login steps 308 through 320 of authorization protocol 200 as described above in reference to FIG. 7.

At step 404, client 34 verifies that the short-term certificate is still valid. The short-term certificate will be valid unless client 34 is prevented from performing a scheduled certificate renewal operation due to a network failure, a credentials server 44 failure, or some other failure or error.

At step 406, client 34 closes all folders in the short-term certificate for applications other than the requested application. In the case where there is no folder for the application in the short-term certificate, all folders in the short-term certificate are closed. Nevertheless, the short-term certificate includes fields outside the folders including the user's public key and the user's identification information copied from the long-term certificate. The fields outside the folders remain visible after all of the folders are closed.

At step 408, client 34 sends the short-term certificate to the requested application. At step 410, the requested application verifies the short-term certificate. In step 410, the requested application verifies the signature of credentials server 44 contained in the short-term certificate. The requested application also checks that the short-term certificate has not expired. The requested application does not have to check whether the short-term certificate has been revoked, because short-term certificates are not subject to revocation.

At step 412, the requested application authenticates the user. In one embodiment, the application authenticates the user by issuing a random challenge, which client 34 forwards to smartcard 50 that contains the user's private key 48. Smartcard 50 combines the challenge with a fresh random value and signs the result. Client 34 forwards the signature and the client's random value to the application, which verifies the signature using the public key contained in the short-term certificate.

At decision step 414, the requested application decides whether to grant or deny access to the user. In step 414, the application employs the information in the visible fields of the short-term certificate.

Step 416 is performed if access is denied to the user in decision step 414. In step 416, client 34 flushes the authorization information attribute of the application from client 34's cache because the authorization information attribute of the application may be out of date. In step 416, the phase I network login steps 308 through 320 of authorization protocol 200 and the phase II application access steps 402 through 414 of authorization protocol 200 are repeated. If the user's smartcard 50 is in the card reader, the step repetition is transparent to the user, unless one of the security checks involved in the repeated steps fails. If the user is denied access once again in step 414 of phase II of authorization protocol 200, the denied access is reported to the user.

Step 418 is performed if access is granted in decision step 414 and if the requested application possibly requires later authorization for a specific transaction. In step 418, the application stores the short-term certificate received from the user.

In some cases, such as when the user must transmit sensitive data to the application, the user authenticates the application. In order for the user to be able to authenticate the application, the application must have a private key and a corresponding public key authenticated by a certificate. In one embodiment, the certificate is a long-term certificate issued by certificate authority 32. In a preferred embodiment, the certificate is a short-term certificate issued by credentials server 44. The user then authenticates the application by using a challenge-response protocol substantially similar to the phase II steps 408, 410, and 412, except that the application and client 34 swap roles.

Figure 9:
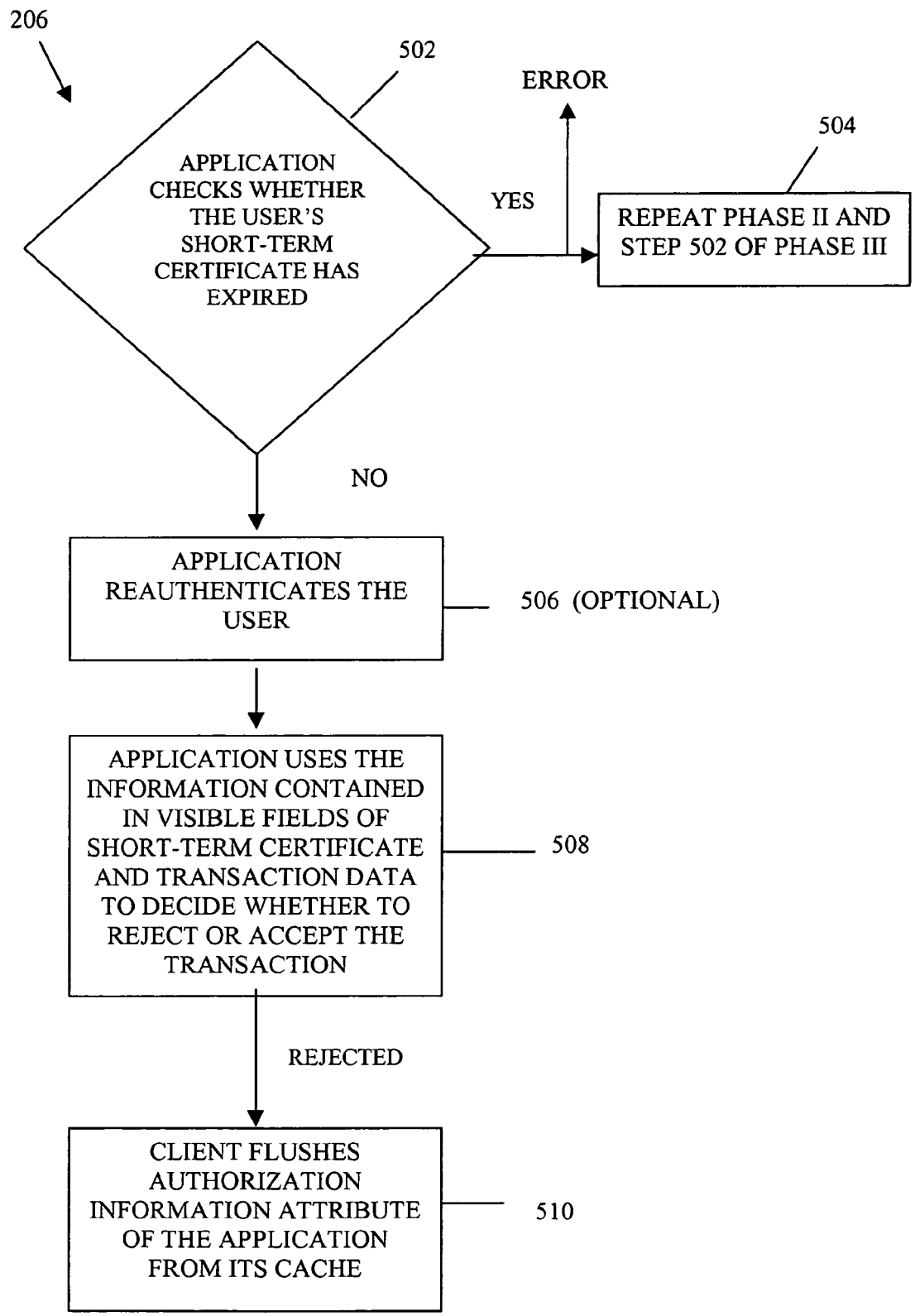
FIG. 9 is a flow diagram illustrating a transaction authorization phase of the authorization protocol of FIG. 6.

The transaction authorization phase III of authorization protocol 200 is generally illustrated at 206 in FIG. 9. The transaction authorization phase III occurs when the user initiates a transaction that requires specific authorization by the application.

At step 502, the application checks whether the user's short-term certificate, which was stored by the application at step 418 of phase II of authorization protocol 200, has expired. If the short-term certificate has expired, the application rejects the transaction with an error message indicating that the short-term certificate has expired.

At step 504, when the application rejects the transaction in step 502, client 34 has a valid short-term certificate, unless a network failure or some other failure has occurred. Thus, all steps 402 through 418 of the application access phase II of authorization protocol 200 and step 502 of the transaction authorization phase III of authorization protocol 200 are repeated. At this point, step 502 should succeed in determining that the user's short-term certificate has not expired. If the user's smartcard 50 is in the card reader, the repeated steps are transparent to the user, unless one of the security checks in the repeated steps fails.

Step 506 is optionally performed if at step 502 the application determines that the user's short-term certificate has not expired. Step 506 is an optional step where the application reauthenticates the user using substantially the same procedure as in step 412 of phase II of authorization protocol 200. If the user's private key 48 is contained in smartcard 50, step 506 ensures that smartcard 50 is still in the card reader. Step 506 is an optional step which only needs to be performed when reauthentication is absolutely necessary for extremely sensitive transactions. If reauthentication fails, the transaction is rejected. Client 34 can request the user to reinsert smartcard 50 into the card reader and the transaction can be retried.

At step 508, the application uses the information contained in the visible fields of the short-term certificate, as well as transaction data, to decide whether to reject or accept the transaction.

At step 510, if the transaction is rejected in step 508, client 34 flushes the authorization information attribute of the application from client 34's cache, because the authorization information attribute may be out of date. Then, the phase I network login steps 308 through 320, the application access phase II steps 402 through 418, and the phase III transaction authorization steps 502 through 508 of authorization protocol 200 are repeated. If the user's smartcard 50 is in the card reader, the repetition of steps is transparent to the user, unless one of the security checks involved in the repeated steps fails. If the transaction is rejected again in step 508 of phase III of authorization protocol 200, the rejection is reported to the user.

The above-described authorization protocol 200 employs digital signatures from any suitable digital signature cryptosystem, such as RSA, which is a public-key cryptosystem for encryption and digital signature developed by RSA Data Security, Inc. Other suitable digital signature cryptosystems are Digital Signature Algorithm (DSA), which is adopted as a standard by the National Institute of Standards and Technology (NIST), and Elliptic Curve Digital Signature Algorithm (ECDSA).

The security of authorization protocol 200 does not rely on the security of the communication channel between client 34 and credentials server 44. Therefore, the network login phase I of authorization protocol 200 can be implemented using a simple Transmission Control Protocol (TCP) connection, or even an exchange of User Datagram Protocol (UDP) datagrams between client 34 and credentials server 44. In an embodiment where confidentiality of the short-term certificate must be protected in step 318 of phase I of authorization protocol 200, a secure Transport Layer Security (TLS) or SSL connection between client 34 and credentials server 44 is used. In this embodiment, client 34 may authenticate credentials server 44, and if so step 306 of phase I of authorization protocol 200 may be omitted.

Similarly, security of authorization protocol 200 does not need to rely on the security of the communication channel between client 34 and the application. Nevertheless, phase II of authorization protocol 200 specifies authentication of the user by the application and optional authentication of the application by the user. If client 34 and the application run on different computer systems, then client 34 and the application use a protocol such as File Transfer Protocol (FTP), Telnet, or Hyper Text Transfer Protocol (HTTP) to communicate.

One approach to providing authentication in conjunction with the selected communication protocol from communicating between client 34 and the application is to extend the existing communication protocol to add authentication. Methods have been proposed for extending the FTP and Telnet communication protocols. If structured short-term certificates are implemented as extensions of X.509v3 certificates, these methods could be used to implement the application access phase II of authorization protocol 200.

A second approach to providing authentication in conjunction with the selected communication protocol for communicating between client 34 and the application is to use TLS to secure the existing communication protocol. TLS can be inserted in the protocol stack between TCP and FTP and between TCP and Telnet. HTTP over SSL, which is the predecessor to TLS, is widely used to provide access to secure documents on the World Wide Web. TLS can accomplish, without modification, the user authentication and the optional application authentication required by phase II of authentication protocol 200, provided that the structured short-term certificates are implemented as extensions of X.509v3 certificates. The second approach has an advantage that it provides confidentiality and integrity protection for the data exchanged between client 34 and the application.

Figure 10:
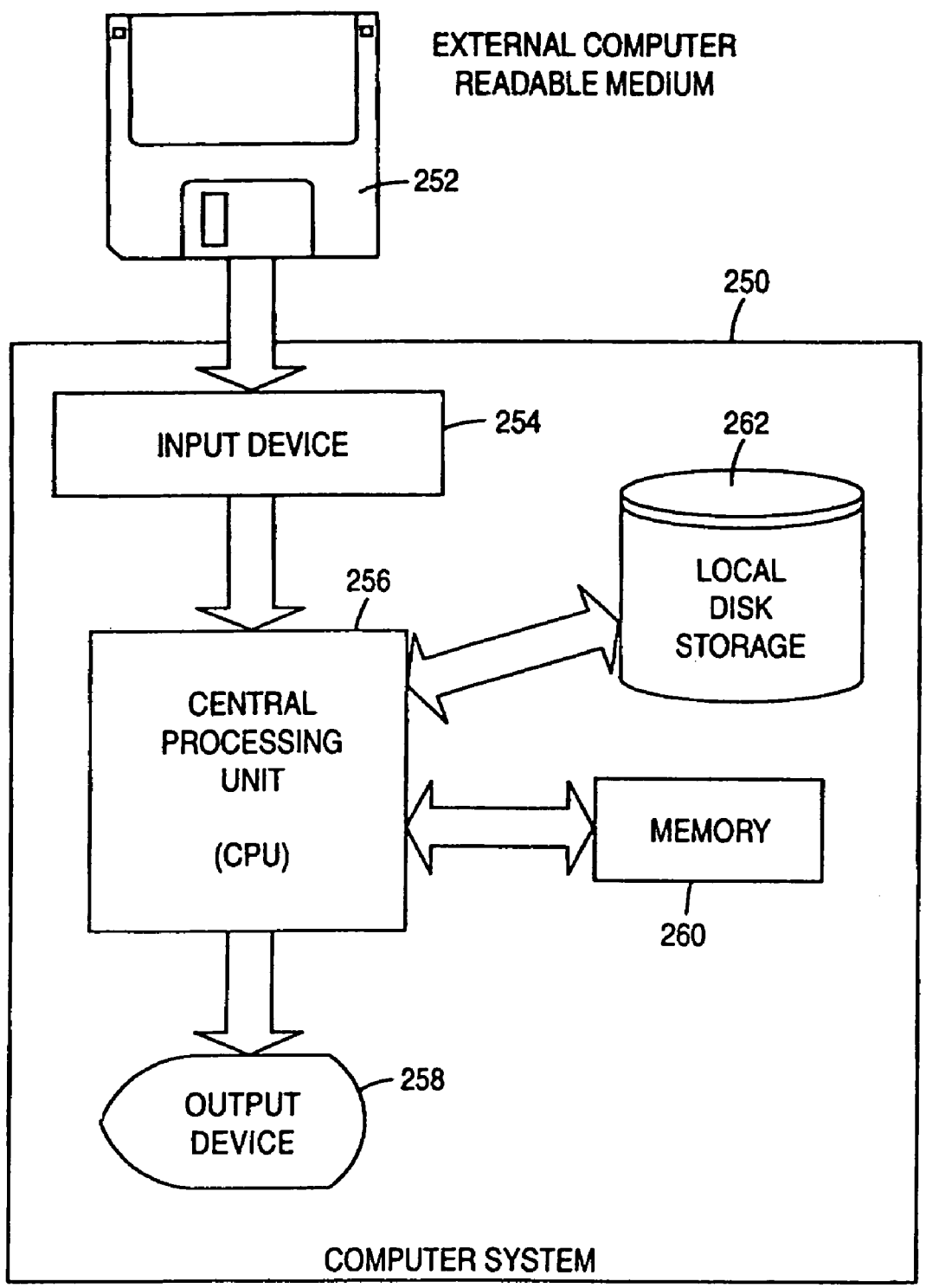
FIG. 10 is a block diagram of a computer system and a corresponding computer readable medium incorporating one or more main software program components of the public key authorization infrastructure of FIG. 1.

FIG. 10 illustrates one embodiment of a computer system 250 and an external computer readable medium 252 which can be employed according to the present invention to implement one or more of the main software program components of public key authorization infrastructure 30. Embodiments of external computer readable medium 252 include, but are not limited to: a CD-ROM, a floppy disk, and a disk cartridge. Any one of the main software program components of public key authorization infrastructure 30 can be implemented in a variety of compiled and interpreted computer languages. External computer readable medium 252 stores source code, object code, executable code, shell scripts and/or dynamic link libraries for any one of the main software program components of public key authorization infrastructure 30. An input device 254 reads external computer readable medium 252 and provides this data to computer system 250. Embodiments of input device 254 include but are not limited to: a CD-ROM reader, a floppy disk drive, and a data cartridge reader.

Computer system 250 includes a central processing unit 256 for executing any one of the main software program components of public key authorization infrastructure 30. Computer system 250 also includes local disk storage 262 for locally storing any one of the main software program components of public key authorization infrastructure 30 before, during, and after execution. Any one of the main software program components of public key authorization infrastructure 30 also utilizes memory 260 within the computer system during execution. Upon execution of any one of the main software program components of public key authorization infrastructure 30, output data is produced and directed to an output device 258. Embodiments of output device 258 include, but are not limited to: a computer display device, a printer, and/or a disk storage device.

CONCLUSION

The public key authorization infrastructure 30 according to the present invention utilizes short-term certificates, such as non-structured short-term certificate 70 or structured short-term certificate 80, which are not subject to revocation. Thus, the requested application does not need to use CRLs or other revocation methods such as OCSP. The structured short-term certificates, such as structured short-term certificate 80, allow one short-term certificate to be used for more than one application. Moreover, all necessary authorization information is contained in the short-term certificate. Thus, the application does not need to access the LDAP directory 42. Overall, public key authorization infrastructure 30 permits the application to be greatly simplified.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A public key authorization infrastructure comprising:
  a client program accessible by a user;
  an application program;
  a certificate authority issuing a long-term public key identity certificate (long-term certificate) that binds a public key of the user to long-term identification information related to the user;
  a directory for storing short-term authorization information related to the user; and
  a credentials server for issuing a short-term public key credential certificate (short-term certificate) to the client, the short-term certificate binds the public key of the user to the long-term identification information related to the user from the long term certificate and to the short-term authorization information related to the user from the directory, wherein the short-term certificate includes meta-data related to the short-term certificate and at least one of an expiration date and an expiration time and is never subject to revocation, wherein as long as the at least one of an expiration date and an expiration time has not expired, the short-term certificate can still be used, wherein the client program presents the short-term certificate to the application program for authorization and demonstrates that the user has knowledge of a private key corresponding to the public key in the short-term certificate.

2. The public key authorization infrastructure of claim 1 wherein a validity period from when the credentials server issues the short-term certificate to the at least one of expiration date and expiration time is sufficiently short such that the short-term certificate does not need to be subject to revocation.

3. The public key authorization infrastructure of claim 1 further comprising:
  a certificate revocation list (CRL), wherein the at least one of expiration date and expiration time of the short-term certificate is before the CRL is next scheduled to be updated.

4. The public key authorization infrastructure of claim 1 wherein the short-term certificate is a non-structured short-term certificate.

5. The public key authorization infrastructure of claim 1 further comprising:
  a second application program; and
  wherein the short-term certificate is a structured short-term certificate including:
    a first folder corresponding to the first named application program and containing long-term information and short-term information as required by the first named application program;

a second folder corresponding to the second application program and containing long-term information and short-term information as required by the second application; and wherein the first folder is open and the second folder is closed when the client presents the short-term certificate to the first named application program for authorization, wherein closing the second folder makes its contents not readable by the first named application program.

6. The public key authorization infrastructure of claim 1 wherein the short-term certificate is an X.509v3 certificate.

7. The public key authorization infrastructure of claim 5 wherein the first folder and the second folder are implemented as extension fields of an X.509v3 certificate.

8. The public key authorization infrastructure of claim 1 wherein the directory further stores the issued long-term certificate.

9. The public key authorization infrastructure of claim 1 wherein the private key is stored in a smartcard accessible by the client program.

10. The public key authorization infrastructure of claim 1 wherein the private key is stored in a secure software wallet accessible by the client program.

11. A method of authorizing a user, the method comprising the steps of:
issuing a long-term public key identity certificate (long-term certificate) that binds a public key of the user to long-term identification information related to the user;
storing short-term authorization information related to the user;
issuing a short-term public key credential certificate (short-term certificate) that binds the public key of the user to the long-term identification information related to the user contained in the long-term certificate and to the short-term authorization information related to the user wherein die short-term certificate includes metadata related to the short-term certificate and at least one of an expiration date and an expiration time and is never subject to revocation; wherein as long as the at least one of an expiration date and an expiration time has not expired, the short-term certificate can still be used, and presenting the short-term certificate on behalf of the user to an application program for authorization and demonstrating that the user has knowledge of a private key corresponding to the public key in the short-term certificate.

12. The method of claim 11 wherein a validity period from when the short-term certificate is issued to the at least one of expiration date and expiration time is sufficiently short such that the short-term certificate does not need to be subject to revocation.

13. The method of claim 11 further comprising the step of:
maintaining a certificate revocation list (CRL), wherein the at least one of expiration date and expiration time of the short-term certificate is before the CRL is next scheduled to be updated.

14. The method of claim 11 wherein the short-term certificate is a non-structured short-term certificate.

15. The method of claim 11 wherein the short-term certificate is a structured short-term certificate including a first folder corresponding to the first named application program and containing long-term information and short-term information as required by the first named application program, and including a second folder corresponding to a second application program and containing long-term information and short-term information as required by the second application, wherein the method further comprises:
closing the second folder and leaving the first folder open prior to the presenting step if the presenting step presents the short-term certificate to the first named application program for authorization, wherein closing the second folder makes its contents not readable by the first named application program.

16. The method of claim 11 wherein the short-term certificate is an X.509v3 certificate.

17. The method of claim 15 wherein the first folder and the second folder are implemented as extension fields of an X.509v3 certificate.

18. The method of claim 11 wherein the method further comprises the step of:
storing the issued long-term certificate in a directory.

19. The method of claim 11 further comprising the step of:
storing the private key in a smartcard.

20. The method of claim 11 further comprising the step of:
storing the private key in a secure software wallet.

* * * * *

UNITED STATES PATENT AND TRADEMARK OFFICE
CERTIFICATE OF CORRECTION

| | | |
|---|---|---|
| PATENT NO. | : 7,340,600 B1 | Page 1 of 1 |
| APPLICATION NO. | : 09/483185 | |
| DATED | : March 4, 2008 | |
| INVENTOR(S) | : Francisco Corella | |

It is certified that error appears in the above-identified patent and that said Letters Patent is hereby corrected as shown below:

In column 3, line 38, delete "PKINIF" and insert -- PKINIT --, therefor.

In column 17, line 37, in Claim 11, delete "die" and insert -- the --, therefor.

Signed and Sealed this

Twenty-second Day of July, 2008

JON W. DUDAS
*Director of the United States Patent and Trademark Office*